United States Patent Office 3,295,916
Patented Jan. 3, 1967

3,295,916
PRODUCTION OF WASH FAST COLORATIONS WITH WATER-SOLUBLE METALLIZED AZO DYES
Leon S. Zielinski, Springville, and Frederic L. Sievenpiper, Alden, N.Y., assignors to Allied Chemical Corporation, New York, N.Y., a corporation of New York
No Drawing. Filed Sept. 27, 1965, Ser. No. 490,679
21 Claims. (Cl. 8—17)

This is a continuation-in-part of our copending application Serial No. 199,595, filed June 4, 1962, now U.S. Patent 3,208,814, issued September 28, 1965.

The present invention relates to a novel process for coloration of textile materials. More particularly it relates to a novel process of dyeing and printing textile materials in bright wash fast shades. It is specifically concerned with a novel procedure for dyeing textiles with water-soluble 1:1 metallized dyestuffs which contain a metal of atomic number of 23 to 30 in complex combination with a chelatable group and are otherwise devoid of reactive hydrogen.

It is known to color textile materials with (1) substances such as substantive dyestuffs which are held on the fiber by relatively loose forces, i.e. hydrogen bonding, (2) substances which are insolubilized on the fiber such as the vat dyestuffs or azoics, (3) substances which are applied with resins or resin-forming materials and are occluded with the resin as it is formed or deposited in and on the fiber, and more recently (4) substances which react with the fiber forming a relatively strong chemical bond, i.e., the reactive dyestuffs.

Each of these classes of dyestuffs or coloring methods is deficient in one or more desirable properties which limits utilization of the class. For example, dyestuffs occluded with resins on the fiber give rise to fabrics of inferior handle and of poor physical properties, i.e., reduced wet strength, stiffness, etc. Such resin-dyed fabrics often retain chlorine when treated with a chlorine bleach, e.g., hypochlorite and on subsequent heating, e.g., ironing, undergo additional strength losses. Vat dyes are generally lacking in brilliance and since they are generally applied from strongly alkaline media are limited as to the fibers to which they can be applied. Azoic dyestuffs are not only expensive but also require multistep application procedures. Substantive dyestuffs, although less costly, are often lacking in one or more fastness properties, while reactive dyestuffs are not only expensive but exhaust poorly and are hence wasteful.

It is therefore an object of the present invention to provide a novel process for coloring textile and related materials in bright shades of excellent fastness to light and to washing.

An ancillary object of the present invention is to provide an effective method for the coloration of cellulosic fibers with non-substantive water-soluble dyestuffs which contain at least one metallized chelatable group but are otherwise devoid of reactive hydrogen.

Another object is to provide a process of coloring textile materials which is economical to operate and can be carried out in a continuous manner.

Other objects will be obvious from the description of the invention that follows.

Our co-pending U.S. application Serial No. 199,595, disclosed a novel process for producing bright wash-fast colorations on textile fabrics and related materials by fixation via a cross-linking reaction of water-soluble dyestuffs containing reactive substituents, e.g., primary and secondary amino, sulfamido, carbonamido, alcoholic and phenolic hydroxyl, and metallized chelated groups, i.e., o,o'-dihydroxyazo, o-hydroxy-o'-carboxyazo, etc., moieties in complex combination with a Werner complex forming metal, e.g., chromium, cobalt, copper, nickel, etc. Tris-aziridinyl phosphine oxides and sulfides were prescribed in the aforementioned application as suitable cross-linking agents. In said co-pending application, water-soluble metallized dyes containing reactive groups in addition to the hydroxy or other group present in the chelatable moiety were preferred.

It has now been found that a surprisingly effective method for coloring textile materials in bright wash-fast shades is provided when employing water-soluble 1:1 metallized azo dyestuffs which contain a metal of atomic number 23 to 30 in complex combination with a chelatable group and are otherwise devoid of reactive-hydrogen containing substituents. This novel process comprises the steps of (A) impregnating the textile material with an aqueous solution, dispersion, emulsion or the like of a mixture of the metallized water-soluble dye and at least one mole per mole of dye of a compound of the group consisting of:

(1) A polyaziridinyl compound of the structure

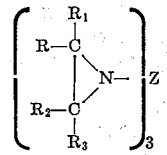

wherein R, $R_1$, $R_2$, and $R_3$ are the same or different and are selected from the group consisting of hydrogen or lower alkyl groups, i.e., alkyl groups of one to five carbon atoms and Z represents a radical selected from the group consisting of

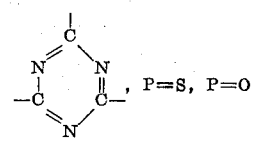, P=S, P=O and (2) A sulfoxo compound of the structure

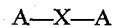

wherein A represents a radical selected from the group consisting of a 2-hydroxyalkyl radical of 2 to 6 carbon atoms which contains at least one hydrogen atom attached to the 1-carbon atom and a 1,2-ethylenically unsaturated aliphatic hydrocarbon radical of 2 to 6 carbon atoms and X represents a member of the group of

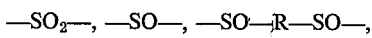

and

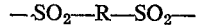

wherein R represents a member of the group consisting of an alkylene radical of 1 to 6 carbon atoms and an alkyl arylene radical of the formula

and (B) subsequently heating the impregnated material to firmly fix the dyestuff to the textile material by a cross-linking reaction.

According to a preferred embodiment of the invention, improved fixation of metallic azo dyestuffs via cross-linking is achieved by employing a mixture of the cross-linking agent and an organic polyisocyanate. This improved fixation is surprising since an organic polyisocyanate provides generally negligible dye fixation when used alone as will be illustrated in Example 13, Part C, of the instant application.

The aziridinyl and sulfoxo compounds employed in our novel process are monomeric, polyfunctional, non-resin forming compounds which are known to impart via a cross-linking reaction, flameproofing, crease resistance and other characteristics, etc., to cellulosic and other fibers. In general cross-linking agents contemplated by our invention are water-soluble and hence are preferably applied to the fiber in an aqueous solution containing the water-soluble dyestuffs. When a water-insoluble polyisocyanate additive is employed according to a preferred embodiment of our process, the isocyanate is desirably dissolved in an inert organic solvent such as perchloroethylene and the resulting solution emulsified in the aqueous dye liquor.

Representative examples of aziridinyl compounds employed as cross-linking reagents according to the present invention include:

2,4,6 tris(1-aziridinyl)s-triazine
2,4,6 tris(2-methyl-1-aziridinyl)s-triazine
Tris(1-aziridinyl)phosphine sulfide
Tris(1-aziridinyl)phosphine oxide
Tris(2-methyl-1-aziridinyl)phosphine oxide
Tris(2-methyl-3-ethyl-1-aziridinyl)phosphine oxide
Tris(2-amyl-1-aziridinyl)phosphine oxide Preferably 2,4,6 tris (2-methyl-1-aziridinyl)s-triazine and tris(1-aziridinyl)phosphine oxide are used. Tris(1-aziridinyl)-phosphine oxide gives an especially good result.

Representative examples of sulfoxo compounds which can be employed in the present process include:

Bis(2-hydroxyethyl)sulfone
Bis(2-hydroxypropyl)sulfone
Bis(2-hydroxyethyl)sulfoxide
1,2-bis(2-hydroxyethylsulfonyl)ethane
1,2-bis(2-hydroxyethylsulfonyl)benzene
Divinyl sulfone (including divinyl sulfone adducts such as the bis(2-sodium thiosulfatoethyl)sulfone disclosed in U.S.P. 3,000,762 which are known to dissociate readily into divinyl sulfone in aqueous alkali)

As a sulfoxo cross-linking agent we preferably employ a bis(2-hydroxyalkyl)sulfone, especially bis(2-hydroxyethyl)sulfone.

Suitable organic polyisocyanates which can be employed according to a preferred embodiment of the invention to provide enhanced fixation of metallized dyestuffs include the following simple polyisocyanates:

2,4,6-toluene triisocyanate
Hexamethylene diisocyanate
2,4-toluene diisocyanate
Cyclohexylene 1,4-diisocyanate
Methylcyclohexylene 2,4-diisocyanate
4,4'-methylene bis(cyclohexylisocyanate)

Adducts of simple polyisocyanates and polyether polyols or polyester polyols which contain free isocyanate groups can also be employed, for example, a 2:1 by weight adduct of 4,4'-methylene bis(cyclohexylisocyanate) and Actol Polyether 21–56 (a polyoxyethylene polyol having a molecular weight of about 1000 and a hydroxyl number of 56).

Advantageously an organic diisocyanate or polyol adduct thereof and especially 4,4'-methylene bis(cyclohexylisocyanate) or a polyether polyol adduct thereof is used. If desired, a bisulfite adduct of the simple polyisocyanate which readily dissociates into the isocyanate can be employed.

The dyestuffs contemplated by the present invention are water-soluble 1:1 metallized azo dyes which are non-reactive with the fiber in the absence of the cross-linking reagent, and are preferably non-substantive to cellulosic fibers. Further, the dyes of the present process contain a metal having an atomic number of 23 to 30 in complex combination with a chelatable substituent, e.g., o,o'-dihydroxyazo, o-hydroxy-o'-carboxyazo, o-hydroxycarboxy, etc. and are otherwise devoid of reactive hydrogen-containing substituents such as primary and secondary amino, sulfamido and the like. Typical metallized azo dyes which are applicable according to the present invention include:

C.I. Acid Orange 74
C.I. Acid Blue 158
C.I. Brown 42
C.I. Black 52
1:1 chromium complex of 2-hydroxy 3-amino-5-chlorobenzene sulfonic acid→2-hydroxy 6-naphthalene sulfonic acid
1:1 chromium complex of 1-amino-2-hydroxy-4-naphthalene sulfon ic acid→β-naphthol
1:1 chromium complex of 1-amino-4-naphthalene sulfonic acid→3-methyl 1-(m-sulfophenyl 5-pyrazolone Preferably an azo dyestuff containing cobalt, copper, nickel and especially chromium in complex combination is employed in the present process.

The instant process is applicable to textile materials which contain a group or groups reactive with aziridinyl and/or sulfoxo compounds such as cellulosic fibers, i.e., cotton, regenerated cellulose which are reactive with both aziridinyl and sulfoxo cross-linking agents, and additionally silk and polyacrylonitrile which are reactive with aziridinyl cross-linking agents. Preferably the present process is employed in coloring cellulosic fibers for which the metallized dyestuffs disclosed above are non-substantive. The present process is adaptable to coloration of not only textile materials, i.e., woven fabrics, but also to fibers, films, foils and the like. It can be used to color paper also.

The reaction conditions, e.g., temperature of the reaction, catalyst, etc. which are employed to effect chemical bonding of the dye to fiber according to the present process will vary widely depending on the particular fiber, cross-linking agent and dyestuff used. In general however, heating the impregnated fiber for about 1 to 10 minutes at about 150–200° C. provides cross-linked dyeings of excellent fastness.

While cross-linking of the metallized dye is accomplished advantageously by heat alone when using a 2,4,6-tris(1-aziridinyl)s-triazine cross-linking agent, it is preferable to promote the cross-linking reaction with an acid catalyst, e.g., zinc fluoborate, when dye fixation is effected by a tris(1-aziridinyl)phosphine oxide or sulfide and with a basic catalyst, e.g., sodium carbonate, when fixation is effected by a sulfoxo compound.

The amount of cross-linking agent necessary to effect dye fixation according to the present process will also vary according to the particular cross-linking agent employed. Generally at least about one mole of aziridinyl cross-linking agent per mole of metallized dyestuff is employed to effect chemical fixation of dye on the fiber. Preferably the aziridinyl compound is charged in excess of this minimum amount, i.e., about 2 to 6 moles of aziridinyl compound per mole of dyestuff are preferably used. Such amounts of the aziridinyl compound are well below those employed in prior art procedures for crease proofing and flame proofing cellulosic fibers. However, more than about 6 moles of aziridinyl cross-linking agent per mole of dye may be used advantageously when it is desired to effect dyeing according to the present invention and crease proofing in a single operation.

The amount of sulfoxo-cross-linking agent used according to the invention is that generally employed by prior art procedures for improving the crease resistance of cellulosic fiber, i.e., about 2 to 10% and preferably 3 to 6% of sulfoxo-compound based on the weight of the fiber.

In dyeing according to a preferred mode of carrying out the invention wherein a polyisocyanate additive is used we employ mixtures of cross-linking agent and polyisocyanate containing about 20–50% and especially about 25–35% by weight polyisocyanate to provide enhanced dye fixation.

The present novel process affords bright dyeings which are fast to washing and scouring under acidic and basic conditions. Fabrics dyed in accordance with our novel method exhibit little tendency to retain chlorine when treated with a chlorine bleaching agent such as hypochloride.

Our novel process is especially adaptable to continuous processes for coloring textile materials, e.g., "pad steam" or "pad dry and cure" processes, wherein high speeds and short contact times are generally used.

In the following examples which illustrate our invention, parts and percentages are by weight and temperatures are in degrees centigrade.

EXAMPLE 1

A solution containing 6 parts of the dyestuff Color Index, Acid Yellow 54 (part II, ref. 19010, a chromium complex (1:1) of 4 sulfoanthranilic acid→3-methyl-1-(4 sulfo-o-tolyl)-5-pyrazolone), 18 parts of an 85% ethanolic solution of tris(1-aziridinyl)phosphine oxides, 2 parts of Triton X–100 (an alkyl aryl polyether alcohol, Rohm and Haas Co.), 6 parts of 40% aqueous zinc fluoborate and 368 parts of water is padded on 20/20 cotton broadcloth (20 parts). The material is passed through squeeze rollers to express padding liquor in excess of about 80% of the weight of the fabric. The fabric is dried at 70–80° under light tension in a stream of air. A portion of the impregnated fabric is baked at 155±5° for ten minutes. Both the baked and unbaked fabric samples are rinsed in 1000 parts of water at ambient temperatures for 1 to 2 minutes. The samples are rinsed in water at 80° and scoured by boiling for 10 minutes in 1000 parts of an aqueous solution containing 0.2% Triton X–100 and 0.1% soda ash. The scoured samples are rinsed in water and dried at 80° in a stream of air. The amount of dyestuff cross-linked to the cotton fabric is estimated by a comparison of the baked and unbaked fabric portions and by a visual determination of the amount of color bleed in the cold water rinsing and scouring of the baked fabric sample. This is estimated by diluting an aliquot of the original padding liquor (the dye strength of which is known) until the intensity of the diluted aliquot is equal to the intensity of color in the combined rinse and scour liquors. From the amount of dyestuff padded onto the cloth and the amount of dyestuff in the rinse and scour liquor the amount of dyestuff cross-linked to the fabric can be estimated.

In this example about 75% of the dyestuff is cross-linked to the cotton fabric which is colored an attractive yellow shade of excellent fastness to light and washing.

EXAMPLES 2–11

The procedure of Example 1 is repeated in Examples 2–11 in dyeing cotton broadcloth samples in wash fast shades with different water-soluble metallized dyestuffs. The dyes employed and the results obtained are listed in Table I.

Table I

| Example | | Color of Dyeing | Percent Dyestuff Cross-linked on Fabric |
|---|---|---|---|
| 2 | Color Index, Acid Orange 74, Part II, ref. 18745. | Orange | 71 |
| 3 | Chromium complex (1:1) of 1-amino-2-hydroxy-4-naphthalene sulfonic acid→3-methyl-1-(m-sulfophenyl) 5-pyrazolone. | Red | 93 |
| 4 | Color Index, Acid Red 183, Part II, ref. 18800. | Reddish orange. | 74 |
| 5 | Chromium complex (1:1) of 2-hydroxy-3-amino-5-chloro benzene sulfonic acid→2-hydroxy-6-naphthalene sulfonic acid. | Violet | 82 |
| 6 | Chromium complex (1:1) of 1-amino-2-hydroxy-4-naphthalene sulfonic acid→β-naphthol. | Blue | 94 |
| 7 | Color Index, Acid Blue 158, Part II, ref. 14880 | Greenish blue. | 87 |
| 8 | Color Index, Acid Brown 42, Part II, ref. 14251. | Reddish brown. | 69 |
| 9 | Color Index, Acid Black 52, Part II, ref. 15711. | Black | 92 |
| 10 | Color Index, Acid Green 12, Part II, ref. 13425. | Bluish green. | 93 |
| 11 | A mixture of the dyestuffs of Examples 3, 5, 7. | Blue | 79 |

EXAMPLE 12

The procedure of Example 1 is repeated employing 36 parts of 2,4,6-tris(2-methyl-1-aziridinyl)s-triazine in place of tris(1-aziridinyl)phosphine oxide and zinc fluoroborate and using 736 parts of water in preparing the padding solution. A yellow cotton dyeing of excellent wash fastness is obtained. About 91% of the dyestuff is cross-linked to cotton fabric as estimated by the testing procedure described in Example 1.

EXAMPLE 13

Part A.—A solution containing 5 parts of the dyestuff of Example 1, 40 parts of a 65% aqueous solution of bis(2-hydroxyethyl)sulfone, 6 parts of soda ash, 2 parts of sodium perborate (an anti-yellowing agent) and 347 parts of water is padded on 80/80 cotton broadcloth and treated substantially as described in Example 1 except that the fabric is baked at 165–170° for two minutes. A yellow dyeing of excellent fastness to washing is obtained. The amount of dye cross-linked to the fiber after scouring and rinsing is 32%.

Part B.—Molten 4,4'-methylene bis(cyclohexylene isocyanate) (26 parts) is dissolved in a mixture of 60 parts of perchloroethylene, 2 parts of Span 20 (sorbitan monolaurate, Atlas Chemical Industries) and 2 parts of Tween 80 (polyoxyethylene sorbitan mono-oleate, Atlas Chemical Industries). The perchloroethylene solution is agitated for 1 minute with a solution of 5 parts of the dyestuff of Example 1 in 200 parts of water in a Waring Blendor at the high speed setting. The resulting emulsion is combined with a solution containing 2 parts of Dabco (triethylene diamine, Houdry Process Corporation), 2 parts of sodium perborate monohydrate, 6 parts of soda ash, and 95 parts of water and agitated for 30 seconds in a Waring Blendor at the low speed setting. The emulsion is padded on cotton and treated as described in Part A above. The amount of dyestuff cross-linked to the baked, rinsed and scoured sample is 7%.

Part C.—An emulsion is prepared by blending the following components in accordance with the procedure described in Part B above. A solution of 8 parts of 4,4'-methylene bis(cyclohexylisocyanate) in a mixture of 50 parts of perchloroethylene, 2 parts of Span 20 and 2 parts of Tween 80. A solution containing 5 parts of the dyestuff of Example 1, 40 parts of 65% aqueous bis(2-hydroxyethyl)sulfone and 200 parts of water. A solution containing 2 parts triethylene diamine, 2 parts sodium perborate monohydrate, 6 parts soda ash and 83 parts of water. The emulsion is padded on 80/80 cotton broadcloth and treated as described by the procedure of Part A. An attractive yellow dyeing of excellent fastness to washing is obtained. The amount of the dyestuff of Example 1 cross-linked to the sample is estimated at 70%.

Comparison of Parts A, B and C of Example 13 illustrates that while cross-linking agents per se are effective in the fixation of the dyestuff, the isocyanate alone has substantially no value as it provides generally negligible dye fixation when used alone and that, unexpectedly, there is a synergistic effect when a mixture of the cross-linking agent and isocyanate is employed in the cross-linking reaction.

EXAMPLE 14

The procedure of Example 13, Part C is repeated in several experiments using different water-soluble metallized dyes. The dyes employed and the results obtained are listed below:

| Dyestuff | Color of Dyeing | Percent Dye Crosslinked on the Fabric |
| --- | --- | --- |
| Color Index, Acid Blue 158 (Part II, ref. 14880). | Greenish blue | 55 |
| Dyestuff of Example 3 | Red | 63 |

From the above examples, it can readily be seen that a remarkably simple, effective and economical procedure has been devised for the production of wash fast colorations on textiles and related materials.

We claim:

1. The process of coloring textile and related materials selected from the group consisting of cellulose, silk and polyacrylonitrile with water-soluble dyestuffs non-reactive with the material which comprises the steps of:
   (A) impregnating the material with an aqueous liquor which contains a mixture of an organic isocyanate, a water-soluble 1:1 metallized azodyestuff which contains a metal of atomic number from 23 to 30 in complex combination with a chelatable group and being otherwise devoid of reactive-hydrogen and at least one mole per mole of said dystuff of a cross-linking agent selected from the group consisting of:
      (1) an aziridinyl compound of the structure:

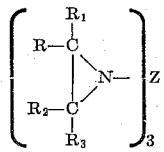

wherein R, R$_1$, R$_2$ and R$_3$ are the same or different and are selected from the group consisting of hydrogen or lower alkyl groups and Z represents a radical selected from the group consisting of:

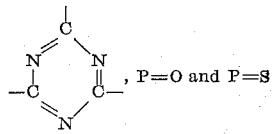, P=O and P=S and
      (2) a sulfoxo compound of the structure:

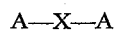

wherein A represents a radical selected from the group consisting of a 2-hydroxyalkyl radical of 2 to 6 carbon atoms which contains at least one hydrogen atom attached to the 1-carbon atom and a 1,2 ethylenically unsaturated aliphatic hydrocarbon radical of 2 to 6 carbon atoms and X represents a member of the group consisting of —SO$_2$—, —SO—, —SORSO—, and —SO$_2$—R—SO$_2$— wherein R represents a member of the group consisting of an alkylene radical and an alkyl arylene radical of the formula —CH$_2$C$_6$H$_4$—CH$_2$—, with the proviso that the material is cellulose when the cross-linking agent is a sulfoxo compound as defined above;

(B) heating the impregnated material to firmly fix the dyestuff to the textile material by a cross-linking reaction.

2. The process of claim 1 wherein from 2 to 6 moles of said cross-linking agent are used per mole of dyestuff.

3. The process of claim 1 conducted at a temperature of about 150–200° C.

4. The process of claim 1 wherein said dyestuff is a chromium complex of an azo dyestuff.

5. The process of claim 1 wherein the isocyanate is 4,4′-methylene-bis(cyclohexylisocyanate) and the cross-linking agent is tris(aziridinyl)phosphine oxide.

6. The process of claim 1 wherein the isocyanate is 4,4′-methylene-bis(cyclohexylisocyanate) and the cross-link agent is 2,4,6-tris(2-methyl-1-aziridinyl)s-triazine.

7. The process of claim 1 wherein the isocyanate is 4,4′-methylene-bis(cyclohexylisocyanate) and the cross-linking agent is bis(2-hydroxyethyl)sulfone.

8. The process of coloring textile and related materials selected from the group consisting of cellulose, silk and polyacrylonitrile with water-soluble dyestuffs non-reactive with the material which comprises the steps of:
   (A) impregnating the material with an aqueous liquor which contains a mixture of an organic isocyanate, a water-soluble 1:1 metallized azo dyestuff which contains a metal of atomic number from 23 to 30 in complex combination with a chelatable group and being otherwise devoid of reactive-hydrogen and at least one mole per mole of said dyestuff of a cross-linking agent having the general formula:

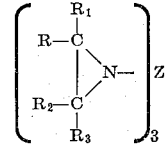

wherein R, R$_1$, R$_2$ and R$_3$ are the same or different and represent hydrogen or lower alkyl groups and Z represents a radical selected from the group consisting of:

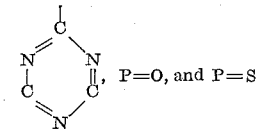, P=O, and P=S (B) heating the impregnated material to firmly fix the dyestuff to the textile material by a cross-linking reaction.

9. The process of claim 8 wherein the cross-linking reaction is conducted in the presence of an acid catalyst.

10. The process of claim 9 wherein said catalyst is zinc fluoborate.

11. The process of coloring cellulose with water-soluble dyestuffs non-reactive with the material which comprises the steps of:
   (A) impregnating the material with an aqueous liquor which contains a mixture of, an organic isocyanate, a water-soluble 1:1 metallized azo dyestuff which contains a metal of atomic number from 23 to 30 in complex combination with a chelatable group and being otherwise devoid of reactive-hydrogen and at least one mole per mole of said dyestuff of a cross-linking agent having the general formula:

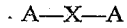

wherein A represents a radical selected from the group consisting of a 2-hydroxyalkyl radical of 2 to 6 carbon atoms which contains at least one hydrogen atom attached to the 1-carbon atom and a 1,2 ethylenically unsaturated aliphatic hydrocarbon radical of 2 to 6 carbon atoms and X represents a member of the group consisting of —SO$_2$—, —SO—, —SORSO—, and —SO$_2$—R—SO$_2$— wherein R represents a member of the group consisting of an alkylene radical and an alkyl arylene radical of the formula —CH$_2$C$_6$H$_4$—CH$_2$—

(B) heating the impregnated material to firmly fix the dyestuff to the textile material by a cross-linking reaction.

12. The process of claim 11 wherein the cross-linking reaction is conducted in the presence of a basic catalyst.

13. The process of claim 12 wherein the catalyst is sodium carbonate.

14. A composition for coloring textile and related materials selected from the group consisting of cellulose, silk and polyacrylonitrile to provide wash fast colorations comprising a mixture of (A) a water-soluble 1:1 metallized azo dyestuff which contains a metal of atomic number of 23 to 30 in complex combination with a chelatable group and being otherwise devoid of reactive-hydrogen and (B) at least one mole per mole of dyestuff of a cross-linking agent selected from the group consisting of:

(1) an aziridinyl compound of the structure:

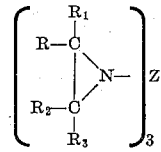

wherein R, R$_1$, R$_2$ and R$_3$ are the same or different and are selected from the group consisting of hydrogen or lower alkyl groups and Z represents a radical selected from the group consisting of:

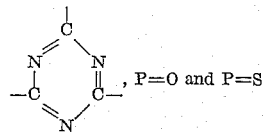, P=O and P=S and (2) a sulfoxo compound of the structure:

A—X—A wherein A represents a radical selected from the group consisting of a 2-hydroxyalkyl radical of 2 to 6 carbon atoms which contains at least one hydrogen atom attached to the 1-carbon atom and a 1,2 ethylenically unsaturated aliphatic hydrocarbon radical of 2 to 6 carbon atoms and X represents a member of the group consisting of —SO$_2$—, —SO—, —SORSO—, and —SO$_2$—R—SO$_2$— wherein R represents a member of the group consisting of an alkylene radical and an alkyl arylene radical of the formula —CH$_2$C$_6$H$_4$—CH$_2$—, with the proviso that the material is cellulose when the cross-linking agent is a sulfoxo compound as defined above and (C) an organic isocyanate.

15. The composition of claim 14 wherein said isocyanate is 4,4'-methylene-bis(cyclohexylisocyanate) and said cross-linking agent is tris(aziridinyl)phosphine oxide.

16. The composition of claim 14 wherein said isocyanate is 4,4'-methylene-bis(cyclohexylisocyanate) and said cross-linking agent is 2,4,6-tris(2-methyl-1-aziridinyl)-s-triazine.

17. The composition of claim 14 wherein said isocyanate is 4,4'-methylene-bis(cyclohexylisocyanate) and said cross-linking agent is bis(2-hydroxyethyl)sulfone.

18. The composition of claim 14 wherein from 2 to 6 moles of said cross-linking agent is present per mole of dyestuff.

19. The composition of claim 14 wherein said dyestuff is a chromium complex of an azo dyestuff.

20. A composition for coloring textile and related materials selected from the group consisting of cellulose, silk and polyacrylonitrile to provide wash fast colorations comprising a mixture of (A) a water-soluble 1:1 metallized azo dyestuff which contains a metal of atom number of 23 to 30 in complex combination with a chelatable group and being otherwise devoid of reactive-hydrogen and (B) at least one mole per mole of dyestuff, as a cross-linking agent, an aziridinyl compound of the structure:

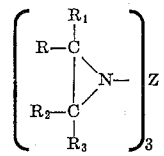

wherein R, R$_1$, R$_2$ and R$_3$ are the same or different and are selected from the group consisting of hydrogen or lower alkyl groups and Z represents a radical selected from the group consisting of:

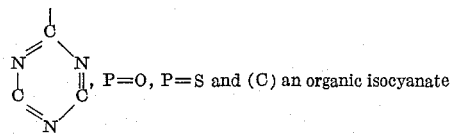, P=O, P=S and (C) an organic isocyanate

21. A composition for coloring cellulose and to provide wash fast colorations comprising a mixture of (A) a water-soluble 1:1 metallized azo dyestuff which contains a metal of atomic number of 23 to 30 in complex combination with a chelatable group and being otherwise devoid of reactive-hydrogen and (B) at least one mole per mole of dyestuff, as a cross-linking agent, a sulfoxo compound of the structure:

A—X—A wherein A represents a radical selected from the group consisting of a 2-hydroxyalkyl radical of 2 to 6 carbon atoms which contains at least one hydrogen atom attached to the 1-carbon atom and a 1,2 ethylenically unsaturated aliphatic hydrocarbon radical of 2 to 6 carbon atoms and X represents a member of the group consisting of —SO$_2$—, —SO—, —SORSO—, and —SO$_2$—R—SO$_2$— wherein R represents a member of the group consisting of an alkylene radical and an alkyl arylene radical of the formula —CH$_2$C$_6$H$_4$—CH$_2$— and (C) an organic isocyanate.

References Cited by the Examiner

UNITED STATES PATENTS

| 2,317,965 | 4/1943 | Bestian et al. | 8—74 |
|---|---|---|---|
| 2,672,718 | 9/1956 | Kleiner et al. | 117—63 |
| 3,044,843 | 7/1962 | Tullio | 8—17 |
| 3,046,075 | 7/1962 | Kantner et al. | |
| 3,084,017 | 4/1963 | Reeves et al. | 8—18 X |
| 3,178,250 | 4/1965 | Ellis et al. | 8—18 |
| 3,208,814 | 9/1965 | Sievenpiper et al. | 8—18 |

NORMAN G. TORCHIN, *Primary Examiner.*

J. HERBERT, *Assistant Examiner.*